Dec. 15, 1931.                A. HELWIG                    1,836,967
                      METAL SHEAR AND WIRE CUTTER
                    Filed June 16, 1930        2 Sheets-Sheet 1
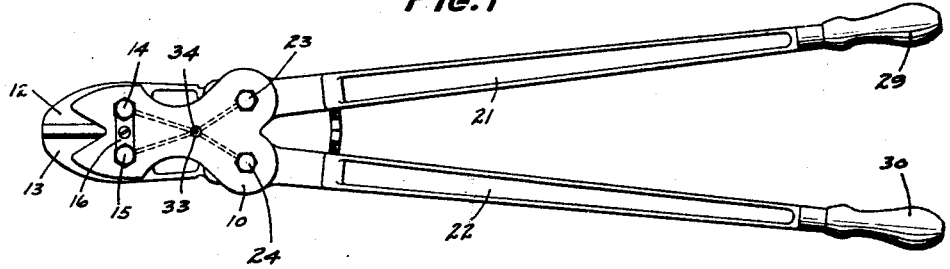
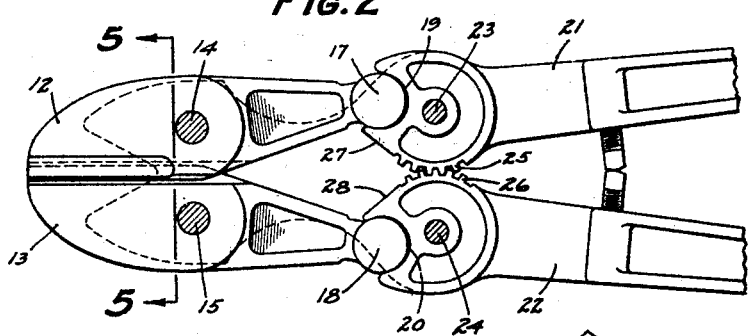
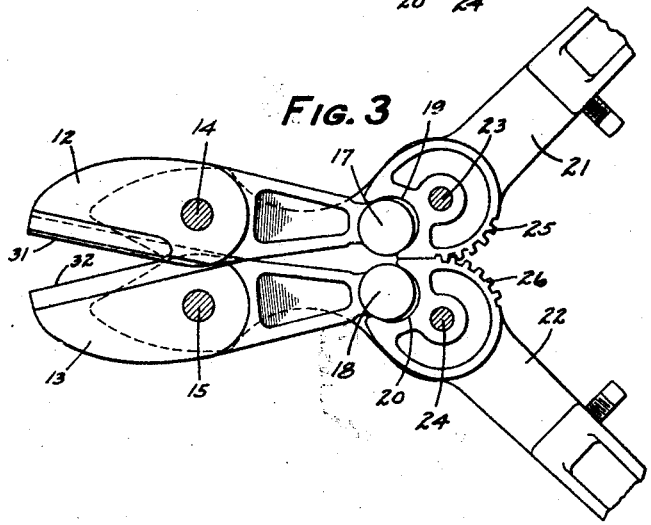
INVENTOR
ANNA HELWIG
BY
ATTORNEYS Dec. 15, 1931.  A. HELWIG  1,836,967
METAL SHEAR AND WIRE CUTTER
Filed June 16, 1930  2 Sheets-Sheet 2
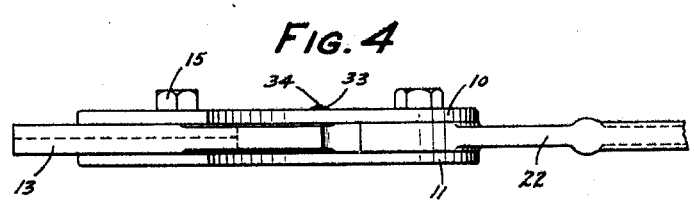
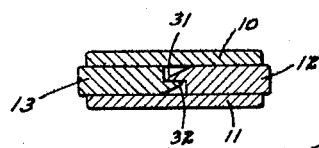
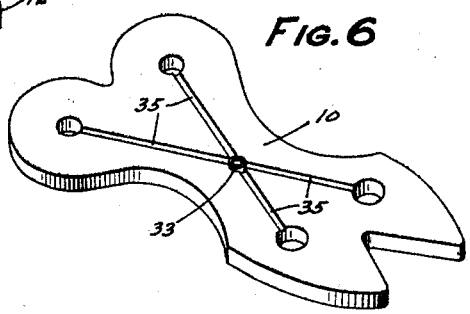
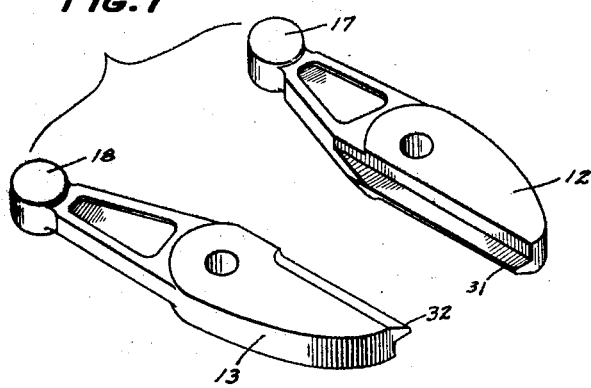
INVENTOR
ANNA HELWIG
ATTORNEYS Patented Dec. 15, 1931

1,836,967

UNITED STATES PATENT OFFICE

ANNA HELWIG, OF ST. PAUL, MINNESOTA

METAL SHEAR AND WIRE CUTTER

Application filed June 16, 1930. Serial No. 461,401.

The present invention contemplates the provision of a shear for sheet metal and the like and for cutting wire, for example electric wire, the object being to provide a tool of the character set forth which shall be of an exceedingly simple, rugged construction and comprised of few moving parts.

Among the objects of the invention are the following: To provide for automatic lubrication of the cutter jaw pivots and the lever pivots, to provide cutter jaws wherein the cutting edges are located on a line substantially in a median plane of the jaws, and to provide a tool of the character set forth in which the parts are so combined and arranged that scraps of metal are prevented from entering between the cutter jaws and the guard plates.

With these and other objects in view, the invention consists in the combination and arrangement of parts substantially as shown in the accompanying drawings. It is understood, however, that the drawings are illustrative, merely, and that the invention is not limited to the details of construction therein disclosed. As will be apparent to those skilled in the art, the invention is susceptible of embodiment in other forms without sacrificing any of its advantages or departing from the scope thereof as defined in the appended claims.

In the drawings:

Fig. 1 is a face view of a tool embodying my invention;

Fig. 2 is a view on an enlarged scale, showing particularly the arrangement of the cutter jaws, the upper guard plate being removed;

Fig. 3 is a view similar to Fig. 2 but showing the cutter jaws in open position;

Fig. 4 is a view in side elevation of so much of the tool as is shown in Fig. 2;

Fig. 5 is a view in cross section taken on line 5—5 of Fig. 2;

Fig. 6 is a perspective view of a guard plate; and

Fig. 7 is a perspective view of a pair of cutter jaws.

Referring now to the drawings, the reference characters 10 and 11 indicate a pair of guard plates between which cutter jaws 12 and 13 are pivotally mounted, as for example, on bolts 14 and 15. The bolts project beyond the top of the plate 10 and are held against rotation by a suitable locking plate 16.

The jaws 12 and 13 are provided at their ends with knuckles 17 and 18 which seat in sockets 19 and 20 formed on the ends of power levers 21 and 22.

The ends of the power levers 21 and 22 are pivoted between the guard plates 10 and 11, as for example, by means of bolts 23 and 24. The ends of these levers are, furthermore, rounded off and provided with intermeshing gear segments 25 and 26, these terminating in straight surfaces 27 and 28, respectively, which when the jaws are swung to open position, come into contact to form a stop limiting the extent of separation of the jaws.

The power levers may be provided with suitable handles or grips 29 and 30 which may be construted of wood impregnated to make it water proof and thus insulated against the conduction of electricity. Obviously, the handles or grips may be made of any other non-conducting material, for example rubber.

As will be seen from an inspection of Fig. 5, the cutting edges 31 and 32 of the jaws 12 and 13 are located on a line which is in substantially a median plane of the jaws, the purpose being to eliminate lateral strains and to insure a clean, smooth cut without leaving rough edges. Furthermore, as will be seen from the said figure the construction and arrangement of the parts is such that metal scraps and the like cannot enter in between the cutter jaws and the guard plates.

My improved shear also includes provision for the automatic lubrication of the pivots hereinbefore referred to. This is accomplish by providing one of the guard plates, for example the plate 10, with a suitable lubricant receptacle or cup 33 provided with a ball valve 34. This valve may be of any well known and preferred construction.

As will be seen from an inspection of Fig. 6, the lubricant receptacle 33 extends through the plate 10 to the bottom thereof and the plate 10 is provided with grooves or channels 35 extending from this receptacle to the pivot points of the cutter jaws and the power levers. It will be understood that the other guard plate will be provided with similar lubricant conducting grooves. The lubricant receptacle 33 is so positioned that lubricant may drop therefrom on to the other guard plate.

In operation a suitable quantity of any desired lubricant, preferably oil, is introduced into the receptacle 33 by way of the ball valve 34. A part of this lubricant will find its way to the lower plate, and in each plate the lubricant conducting grooves serve to conduct the lubricant to the pivot points. Thus, the points of wear are maintained lubricated at all times without the constant attention of the user of the tool.

I claim as my invention:

1. A tool of the character described, comprising a pair of plates, cutter jaws pivotally mounted between said plates, lubricant-conducting grooves leading to said pivotal mountings, and means for supplying lubricant to said grooves.

2. A tool of the character described, comprising a pair of plates, cutter jaws pivotally mounted between said plates, lubricant-conducting grooves leading to said pivotal mountings, and a lubricant receptacle communicating with said grooves.

3. A tool of the character described, comprising a pair of plates, cutter jaws and power levers pivotally mounted between said plates, a lubricant receptacle in one of said plates, and grooves leading from said receptacle to said pivotal mountings for conducting lubricant thereto.

4. A tool of the character described, comprising a pair of plates, cutter jaws and power levers pivotally mounted between said plates, a lubricant receptacle in one of said plates, and grooves communicating with said receptacle and leading to said pivotal mountings for supplying lubricant thereto.

5. A tool of the character described, comprising a pair of plates, cutter jaws and power levers pivotally mounted between said plates, a lubricant receptacle in one of said plates located in a space between said cutter jaws, whereby part of a lubricant introduced into said receptacle will be transmitted to the other of said plates, and grooves in said plates leading to said pivotal mountings for conducting lubricant thereto.

In witness whereof, I have hereunto set my hand this 12th day of June, 1930.

ANNA HELWIG.